United States Patent [19]

Mannschke

[11] Patent Number: 4,566,753
[45] Date of Patent: Jan. 28, 1986

[54] OPTICAL STAR COUPLER

[75] Inventor: Lothar Mannschke, Eckental, Fed. Rep. of Germany

[73] Assignee: U.S. Philips Corporation, New York, N.Y.

[21] Appl. No.: 736,976

[22] Filed: May 22, 1985

Related U.S. Application Data

[63] Continuation of Ser. No. 515,705, Jul. 20, 1983, abandoned.

[30] Foreign Application Priority Data

Aug. 7, 1982 [DE] Fed. Rep. of Germany ....... 3229571

[51] Int. Cl.[4] .............................................. G02B 5/172
[52] U.S. Cl. ............................. 350/96.16; 350/96.18
[58] Field of Search ................ 350/96.15, 96.16, 96.18

[56] References Cited

U.S. PATENT DOCUMENTS 3,937,557  2/1976  Milton ........................... 350/96.16
4,285,570  8/1981  Minemura et al. .............. 350/96.18
4,305,641  12/1981  Witte ............................... 350/96.15

FOREIGN PATENT DOCUMENTS 3035858  5/1982  Fed. Rep. of Germany .
56-1002   1/1981  Japan .
56-35106  4/1981  Japan ............................ 350/96.15

OTHER PUBLICATIONS

Miyake et al., "Angular Scrambling Star Couplers," Proc. of Optical Commun. Conf. (Amsterdam), Sep. 1979, pp. 6.5-1 to 6.5-4.

Primary Examiner—John Lee
Attorney, Agent, or Firm—Marc D. Schechter

[57] ABSTRACT

The ends of tapered optical waveguides are focused onto one another by means of a graded index rod lens. The tapered tips are connected to the end faces of the lens. The coupling conditions are improved by taking into account the cladding modes emerging from the tapered portions.

10 Claims, 1 Drawing Figure

OPTICAL STAR COUPLER

This is a continuation, of application Ser. No. 515,705 filed July 20, 1983, now abandoned.

BACKGROUND OF THE INVENTION

The invention relates to an optical star coupler having tapered optical wave guides or fibers for branching in an optical transmission system. Star couplers are used, for example, in bus systems in optical information transmission networks.

German Offenlegungsschrift No. 3035858 discloses a star coupler comprising tapered fibers. Therein, the transition of modes which can no longer propagate in the fiber core into the fiber cladding is taken into account. However, a drawback remains in that undesirable coupling losses occur at butt-jointed ends of the tapered portions of the fibers, particularly if the diameters of the ends to be joined are not the same. This is applicable, notably, to asymmetrically constructed star couplers. Even when high-precision connection elements are used, such coupling losses can be reduced only slightly.

SUMMARY OF THE INVENTION

It is an object of the invention to provide a star coupler in which the coupling losses are minimized and which can be manufactured without special connection means.

This object is achieved in a star coupler in which the tapered portions are connected to oppositely situated end faces of at least one graded index rod lens. The butt-jointed ends of the tapered portions are replaced by an optical imaging system which further reduces the coupling losses below what can be achieved in the known star coupler.

The invention is based on the recognition of the fact that graded index rod lenses adapt for changes of the radiation lobe or radiation cone which are caused, for example, by tapering the ends of the optical fibers.

DESCRIPTION OF THE PREFERRED EMBODIMENTS

Figure 1:
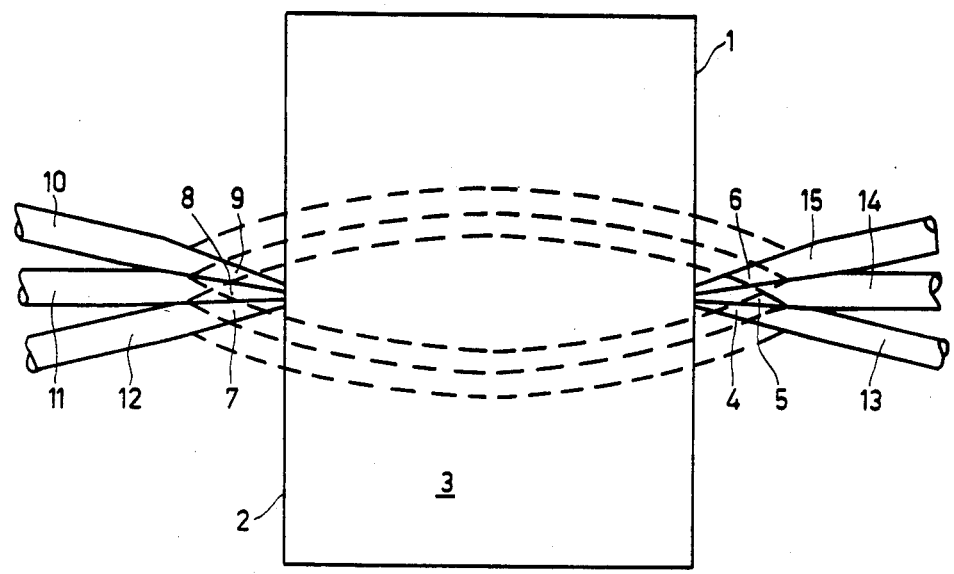
FIG. 1 is a side elevational view of an optical star connector according to the invention.

The tips of tapered portions 4 to 9 of fibers 10 to 15 are connected centrally to the end faces 1 and 2 of the graded index rod lens (GRIN lens) 3. Connection can be made (i) by means of a plug connection whereby two GRIN lens halves are combined, or (ii) by arranging the tapered ends on the end faces of a single GRIN lens. A particularly simple method for permanent connection of the tapered portions to the relevant end faces of the GRIN lens is the use of an adhesive.

The reduction of the possible propagation modes caused by the tapering of the fibers causes the radiation transmitted by the fibers to emerge from the core and subsequently from the cladding so that it forms a radiation cone whose solid angle is no longer comparable with that of the radiation normally emerging from a fiber. By choosing a suitable length for the GRIN lens 3, however, the radiation of the modes in the optical waveguide and its tapered portion (which radiation propagates externally in different radiation spaces, as represented by broken lines in the drawing) can also be transmitted. In order to image so-called cladding modes on the output optical waveguides (at the output coupling zone), the length of GRIN lens 3 should be between $\frac{1}{4}$ and $\frac{1}{2}$ pitch. Consequently, the intersections of the core modes to be transmitted is advanced into the GRIN lens 3. Moreover, all connected optical waveguides are uniformly irradiated. A special advantage is the coupling of the radiation of all cladding modes and the emerging radiation of the remaining core modes (near the centre of the radiation) entering the GRIN lens which can each be focused on the output coupling zone by the GRIN lens.

Similar versions of star couplers according to the invention can be manufactured in which the GRIN lens must be adapted to the relevant imaging circumstances. It is a common aspect of these versions that the imaging of the GRIN lens not only takes into account the core radiation but also radiation of the cladding modes. Emerging radiation at the area of the fiber cladding thus results in a particularly good mixing of the radiation to be uniformly distributed.

What is claimed is:

1. A star coupler comprising:
   a first group of optical waveguides having tapered portions, each tapered portion terminating in an end face of the waveguide, said tapered portions being arranged adjacent to one another so that the end faces of the waveguides form a first group end face having a periphery;
   a second group of optical waveguides having tapered portions, each tapered portion terminating in an end face of the waveguide, said tapered portions being arranged adjacent one another so that the end face of the waveguides form a second group end face having a periphery; and
   a graded index rod lens having first and second opposite end faces having peripheries;
   characterized in that:
   the first group end face is connected to the first end face of the graded index rod lens;
   the second group end face is connected to the second end face of the graded index rod lens; and
   the entire periphery of the first end face of the graded index rod lens surrounds and is spaced from the entire periphery of the first group end face, and the entire periphery of the second end face of the graded index rod lens surrounds and is spaced from the entire periphery of the second group end face, such that radiation emerging from the tapered portions of the first group of waveguides will be incident on the first end face of the graded index rod lens and will be focused by the graded index rod lens onto the tapered portions of the second group of waveguides.

2. A star coupler as claimed in claim 1, characterized in that the first end face of the graded index rod lens is separated from the second end face of the graded index rod lens by a distance between one-fourth and one-half of the pitch of the graded index rod lens for the radiation transmitted therethrough.

3. A star coupler as claimed in claim 2, characterized in that the group end faces are connected to the end faces of the graded index rod lens by an adhesive.

4. A star coupler as claimed in claim 3, characterized in that the group end faces are centrally located on the end faces of the graded index rod lens.

5. A star coupler as claimed in claim 4, characterized in that the graded index rod lens comprises two detachable portions, one group of waveguides being connected to each portion.

6. A star coupler as claimed in claim 1, characterized in that the group end faces are connected to the end faces of the graded index rod lens by an adhesive.

7. A star coupler as claimed in claim 6, characterized in that the group end faces are centrally located on the end faces of the graded index rod lens.

8. A star coupler as claimed in claim 7, characterized in that the graded index rod lens comprises two detachable portions, one group of waveguides being connected to each portion.

9. A star coupler as claimed in claim 1, characterized in that the group end faces are centrally located on the end faces of the graded index rod lens.

10. A star coupler as claimed in claim 9, characterized in that the graded index rod lens comprises two detachable portions, one group of waveguides being connected to each portion.

* * * * *